United States Patent [19]
Fallahi et al.

[11] Patent Number: 5,406,462
[45] Date of Patent: Apr. 11, 1995

[54] APPARATUS FOR COLLECTING AND TRANSMITTING LIGHT

[75] Inventors: Amir Fallahi, Holly; Donald J. Jagos, Owosso; Jeyachandrabose Chinniah; Mahendra Dassanayake, both of Troy; Jeffrey A. Erion, Plymouth; John X. Li, Farmington Hills, all of Mich.

[73] Assignee: Ford Motor Company, Dearborn, Mich.

[21] Appl. No.: 225,369

[22] Filed: Apr. 8, 1994

Related U.S. Application Data

[63] Continuation of Ser. No. 997,385, Dec. 28, 1992, abandoned.

[51] Int. Cl.6 .......................... F21V 8/00; F21V 7/09
[52] U.S. Cl. ...................... 362/32; 362/302; 362/304; 362/347
[58] Field of Search .............. 362/346, 297, 298, 299, 362/302, 304, 347, 32

[56] References Cited

U.S. PATENT DOCUMENTS

| | | |
|---|---|---|
| 1,815,751 | 7/1931 | Whalen . |
| 3,437,804 | 4/1969 | Schaefer et al. ............... 362/32 |
| 3,455,622 | 7/1969 | Cooper ........................... 362/32 |
| 4,241,382 | 12/1980 | Daniel . |
| 4,389,698 | 6/1983 | Cibie . |
| 4,731,713 | 3/1988 | Perthus ............................. 362/346 |
| 4,755,918 | 7/1988 | Pristash et al. . |
| 4,803,601 | 2/1989 | Collot et al. . |
| 4,851,968 | 7/1989 | Nino ............................. 362/299 |
| 4,883,333 | 11/1989 | Yanez . |
| 4,912,605 | 3/1990 | Whitehead .................... 362/32 |

FOREIGN PATENT DOCUMENTS

| | | |
|---|---|---|
| 385456 | 12/1932 | United Kingdom . |
| 423742 | 2/1935 | United Kingdom . |
| 1348252 | 3/1974 | United Kingdom . |
| 1497778 | 1/1978 | United Kingdom . |
| 2040431 | 8/1980 | United Kingdom . |

*Primary Examiner*—Ira S. Lazarus
*Assistant Examiner*—L. Heyman
*Attorney, Agent, or Firm*—Kevin G. Mierzwa; Roger L. May

[57] ABSTRACT

An apparatus includes a reflective surface for high efficiency collection, transmission and emission of light. Light collected by an ellipsoidal and hyperboloidal portion of the reflective surface is directed into a light guide. Additionally, a paraboloidal portion may be added and used in combination with a lens element to distribute the light reflected by the reflective surface in a beam pattern. When used as an emitter lens profile is smaller than the overall diameter of the reflective surface. When used as a collector, the reflective surface receives and concentrates light onto the end of a light pipe.

12 Claims, 3 Drawing Sheets

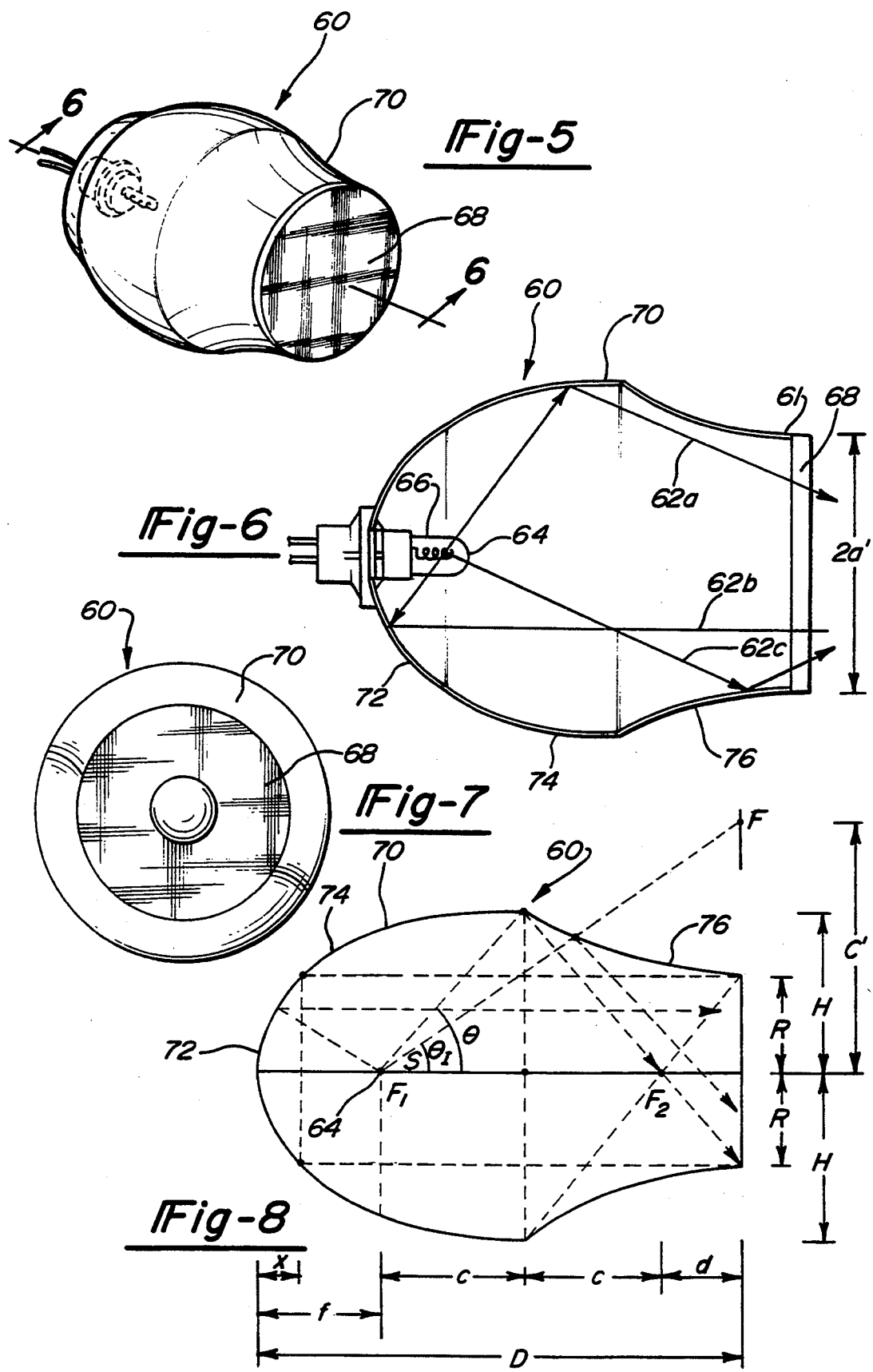

APPARATUS FOR COLLECTING AND TRANSMITTING LIGHT

This is a continuation of U.S. patent application Ser. No. 07/997,385, filed Dec. 28, 1992, now abandoned.

BACKGROUND OF THE INVENTION

1. Field of the Invention

The present invention relates generally to a lighting system for use with a vehicle and more specifically to an apparatus used to collect and transmit light.

2. Description of the Related Art

Conventional vehicle lighting systems typically utilize a bulb and reflector combination. In a bulb and reflector combination, a filament of the bulb is placed at or near a focal point of the reflector. The focal point of a reflector is that point at which parallel rays of light meet after being reflected by the reflector. Conversely light rays emanating from the focal point are reflected as parallel rays of light. Energy supplied to the filament radiates as light over a $4\pi$ steradian solid angle. A portion of the radiated light is collected by the reflector and reflected outward. The outwardly reflected light is passed through a lens to form a light beam.

With the advent of light guides such as fiber optics, the ability to use a remote light source and a fiber optic light guide to transfer light generated at the remote light source to a distant location became available. A system of reflectors and lenses is typically used to direct light emitted from the light source, such as a bulb filament, into the end of a fiber optic light guide. The amount of light that can be effectively directed into the fiber optic light guide varies with respect to the numerical aperture of the fiber optic light guide. The numerical aperture is a number which corresponds to the acceptance angle; i.e. the critical angle at which light striking the end of the fiber optic light guide will enter the light guide. Light striking the light guide at an angle greater than the critical angle will reflect off the face of the fiber optic light guide and become unusable light thus lowering the collection efficiency.

Until recently, the importance of the critical angle with respect to the end of the fiber optic light guide was not recognized and the fiber optic light guide was simply brought closer to the light source. However, this resulted in a greater amount of light striking the end of the fiber optic light guide at an angle greater than the critical angle resulting in a decreased collector efficiency. In an attempt to increase the amount of light entering the fiber optic light guide, reflective and focusing systems were developed.

An example of such a system is disclosed in U.S. Pat. Nos. 4,241,382 and 4,755,918. These patents disclose reflective systems having a combination of elliptical and spherical mirrors to direct and focus the light emitted from a bulb filament onto the end of a fiber optic light guide. The light emitted from the source is reflected by a spherical reflector and returned through the source prior to striking an elliptical reflector which focuses the light onto the end of the fiber optic light guide.

Since losses occur at each reflective surface, each additional reflection reduces the efficiency of the apparatus. Also, when the light is reflected through the filament, additional losses occur due to the light ray striking the filament. The filament is not a point source, thus each reflection of the light increases the deviation from the desired path of travel until the deviation becomes significant and the reflected light ray is no longer focused upon the fiber optic light guide. Finally, these systems tend to focus all of the light onto the small area of the elliptical reflector. Since the light source or bulb filament is not a point source the system becomes very sensitive to filament size and location, resulting in greater angular deviation of the light ray.

Typically a greater intensity light source is used to make up for any inefficiencies of a reflective system. However, even with a relatively efficient light source each watt of power supplied to the bulb filament results in only 0.25 watts of optical energy (light), and the remaining 0.75 watts is non-optical energy (heat). Thus the use of a higher intensity light source results in excessive heat.

Therefore, it is desireable to have a highly efficient compact apparatus which collects and focuses light produced by a bulb filament in a predetermined pattern onto the end of a fiber optic light guide and at angle less than the critical angle of the fiber optic light guide. It is further desired to avoid reflected and redirected light from passing back through the filament. The occurrences of reflection of the light rays should be kept to a minimum prior to entering the fiber optic light guide to reduce any additional losses due to reflection and defocusing of the light rays.

SUMMARY OF THE INVENTION

Accordingly, the present invention is a highly efficient compact apparatus for use in providing usable light in the form of a light beam or focusing the light emitted from a filament onto the end of a fiber optic light guide. In general, the apparatus includes a light source for emitting light and a reflective surface having an ellipsoidal portion and a hyperboloidal portion wherein the reflective surface collects, focuses and distributes the light emitted by the light source. The light may be distributed in a predetermined beam pattern and used as a vehicle headlight or the light may be focused onto the end of a fiber optic light guide for transmission to a distant location.

One advantage of the present invention is that a compact apparatus may be developed which provides for efficient light collection and focusing upon a relatively small target or receiving area. An additional advantage of the present invention is the ability to obtain a greater amount of light from a lower wattage source which reduces both energy consumption and infra-red heat energy. Additionally, the present invention reduces the number of reflections prior to the light ray being focused onto the end of a fiber optic light guide; thus improving the overall collection efficiency of the apparatus.

BRIEF DESCRIPTION OF THE DRAWINGS

FIG. 5 is a perspective view of an apparatus according to the present invention illustrated as an illuminator for use with a vehicle.

FIG. 6 is a sectional view taken along line 6—6 of FIG. 5.

FIG. 7 is a front view of the apparatus of FIG. 5.

FIG. 8 is a schematic side view of the apparatus of FIG. 5.

DESCRIPTION OF THE PREFERRED EMBODIMENT(S)

Figure 1:
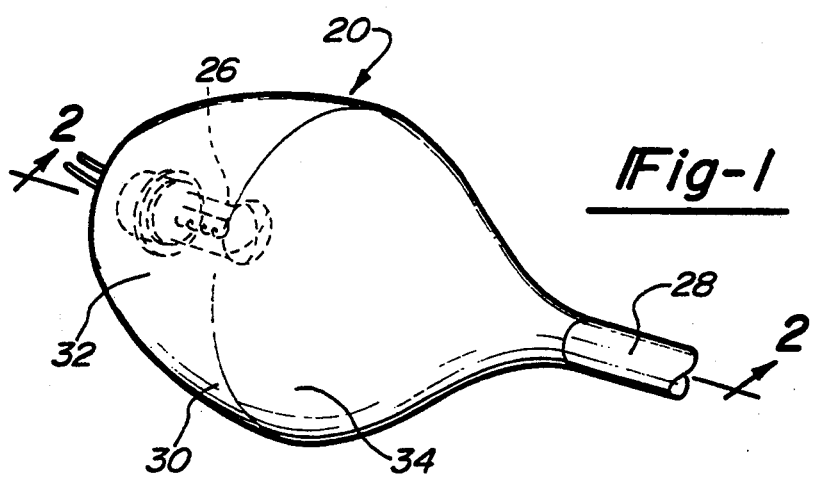
FIG. 1 is a perspective view of an apparatus according to the present invention, illustrated for use with a fiber optic light guide.
Figure 3:
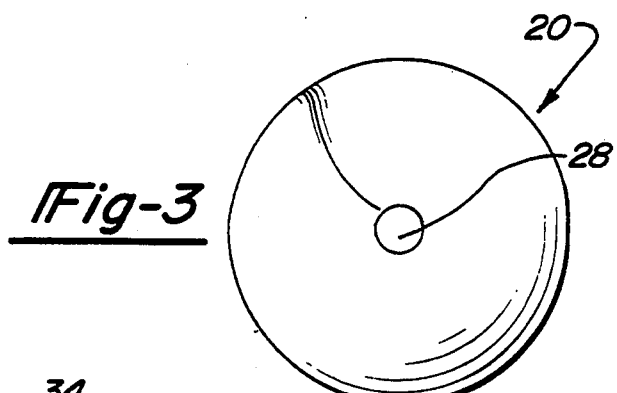
FIG. 3 is a front view of the apparatus of FIG. 1.

Referring to the drawings and more particularly to FIG. 1–4 thereof, an apparatus illustrated as a collector 20 for collecting and focusing light rays 22 emitted by a light source 24, having a bulb filament 26, onto the end of a fiber optic light guide 28 is shown. As illustrated, the collector 20 has a reflective surface 30 for collecting the light rays. The reflective surface 30 has ellipsoidal 32 and hyperboloidal 34 portions. It should be appreciated that the present invention provides a collector 20, having a reduced length along the focal axis 31 (FIG. 4), which collects substantially all of the light emitted from the light source 24.

Figure 2:
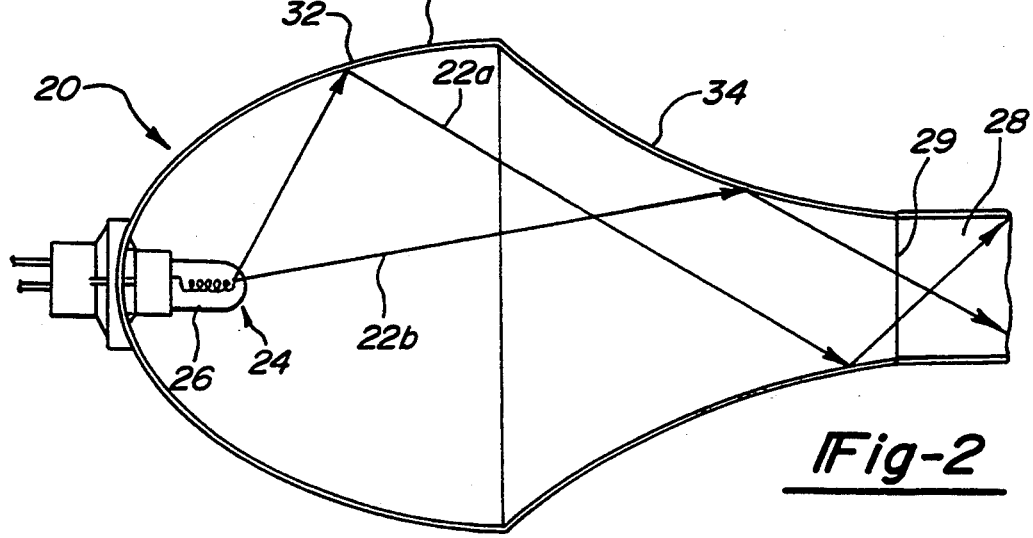
FIG. 2 is a sectional view taken along line 2—2 of FIG. 1.

As shown in FIG. 2, light rays 22a–22b emitting from the light source 24 strike both the ellipsoidal portion 32 and hyperboloidal portion 34 of the reflective surface 30. The light rays 22a–22b are reflected from the ellipsoidal and hyperboloidal portions 32 and 34 of the reflective surface 30 toward an end 29 of the light guide 28. The ellipsoidal 32 and hyperboloidal 34 portions focus the light rays 22a–22b onto the end 29 of the light guide 28 at an angle less than the acceptance angle of the light guide 28. It should be appreciated that focusing the light rays 22a–22b in this manner increases the number of light rays entering the light guide 28 while decreasing the number of times each light ray is reflected to correspondingly limit reflection losses.

Figure 4:
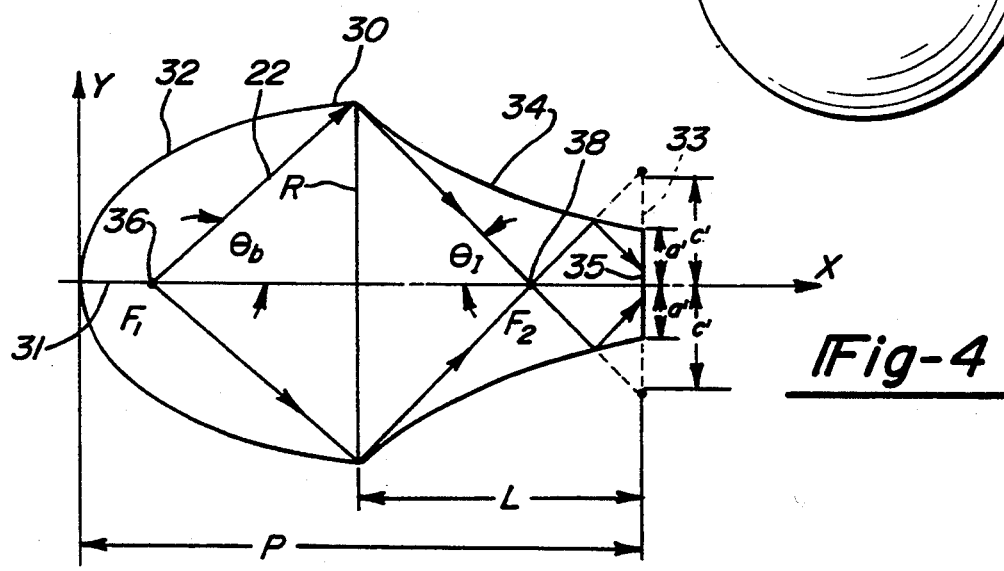
FIG. 4 is a schematic side view of the apparatus of FIG. 1.

Referring now to FIG. 4, a schematic of the collector 20 is shown. The ellipsoidal portion 32 of the reflective surface 30 has a first focal point ($F_1$) 36 and a second focal point ($F_2$) 38. Placing the light source 24 at the first focal point ($F_1$) 36 of the ellipsoidal portion 32 causes light rays 22 emitted from the light source 24 to focus at the second focal point ($F_2$) 38 of the ellipsoidal portion 32. A portion of the light reflected by the ellipsoidal portion 32 will be directed into the light guide 28 without any additional incidences of reflection. The remaining light will strike the hyperboloidal portion 34 of the reflective surface 30. The hyperboloidal portion 34 concentrates light received from the ellipsoidal portion 32 onto the end 29 of the light guide 28. In addition to concentrating the light received from the ellipsoidal portion 32, the hyperboloidal portion 34 also receives and reflects light directly from the light source 24. The addition of the hyperboloidal portion 34 improves the efficiency of the collector 20.

The configuration of the reflective surface 30 is determined based upon several predetermined parameters including: the numerical aperture or acceptance angle ($\theta_f$), the radius of the fiber optic light guide (a'), the radius (R) of the elliptical portion 32 of the reflective surface 30 and the angle ($\theta_b$) that the light rays are emitted from the bulb filament. A standard bulb with or without a black or non-reflective coating at the tip only emits light outward at an angle ($\theta_b$) greater than 30° from the focal axis 31. From a practical standpoint those bulbs without a black tip still only emit light outward at an angle greater than 30° with respect to the focal axis due to the small or reduced end view (taken along the focal axis) of the filament.

From the foregoing predetermined parameters the following unknowns, which define the ellipsoidal 32 and hyperboloidal 34 portions of the reflective surface 20, are determined: c'=focal point of the hyperboloidal portion 34, c=focal point of the ellipsoidal portion 32, a=the vertex of the ellipsoidal portion 32 and L=the length of the hyperboloidal portion 34.

The hyperboloidal portion 34 concentrates the light reflected by the ellipsoidal portion 32 by converting the low angle light rays striking the large area surface 33 (focal disc) defined by c' into high angle light rays striking a smaller area surface 35 (focal disc) defined by a'. Since the smaller area 35 and the maximum angle the light may strike the smaller area 35 are known, a'=-radius of the fiber optic light guide 28 and $\theta_f$=the maximum acceptance angle, the maximum angle of incidence ($\theta_I$) of the light rays striking the large area surface 33 may be calculated by the following LaGrangian invariant equation:

$$a'^2(1-\cos \theta_f) = R^2 (1-\cos \theta_I)$$

and $$a'^2 \sin^2 f/2 = R^2 \sin^2 \theta_I/2$$

and $$\sin \theta_I/2 = a'/R \sin \theta_f/2$$

therefore $$\theta_I = 2 \sin^{-1} [a'/R \sin \theta_f/2]$$

Once $\theta_I$ is known, the remaining unknowns c', c, a and L, which define the reflective surface 30, are determined by the following equations. The variables having a prime superscript represent coordinates of the hyperboloidal portion 34 and unprimed or non-primed variables represent the coordinates of the ellipsoidal portion 32 of the reflective surface 30. Solving for the focal point (c') of the hyperboloidal portion 34 of the reflective surface 30:

$$\tan \theta_1 = \frac{R + c'}{L}$$

and $$\frac{R^2}{a'^2} - \frac{L^2}{b'^2} = 1$$

solving for L $$\frac{R^2 - a'^2}{a'^2} = L^2 b'^2$$

$$L^2 = \frac{b'^2}{a'^2} (R^1 - a'^2)$$

$$L = \frac{c'^2 - a'^2}{a'^2} (R^2 - a'^2)$$

-continued $$L = \left(\frac{c'^2}{a'^2} - 1\right)(R^2 - a'^2)$$

such that $$\tan \theta_I = \frac{(R + c')a'^2}{(c'^2 - a'^2)(R^2 - a'^2)}$$

simplifying and solving for $c'$ $$c'^2 - a'^2 = \frac{Ra'^2}{(R^2 - a'^2)\tan \theta_I} + \frac{a'^2 c^1}{(R^2 - a'^2)\tan \theta_I}$$

wherein $$c'^2 - \frac{a'^2}{(R^2 - a'^2)\tan \theta_I} c^1 - \left[1 + \frac{R}{(R^2 - a'^2)\tan \theta_I}\right]$$

$$a'^2 = 0.$$

Once $c'$ is known, the shape or curvature of the hyperboloidal portion 34, which is a surface of revolution, can be determined by $$\frac{y^2}{a'^2} - \frac{x^2}{b'^2} = 1$$

where $b'^2 = c'^2 - a'^2$. Solving for the ellipsoidal portion 32:

$$\frac{R}{\tan \theta_b} + \frac{R}{\tan \theta_I} = 2c$$

simplifying and solving for $c$ $$c = \frac{R}{2}\left(\frac{\tan \theta_I + \tan 30}{\tan \theta_I \tan 30}\right)$$

wherein $\theta_b = 30$ The equation for an ellipse is $$\left(\frac{x - a}{a}\right)^2 + \frac{y^b}{b^2} = 1$$

where $c^2 = a^2 - b^2$ substituting for x and y $$\left(\frac{\frac{R}{\tan 30} - c}{a}\right)^2 + \frac{R^2}{a^2 - c^2} = 1$$

simplifying and solving for a $$(\sqrt{3} R - c)^2 (a^2 - c^2) + R^2 a^2 = a^4 - c^2 a^2$$

results in $$a^4 - a^2 (c^2 + R^2 + [\sqrt{3} R - c]^2) + c^2 (\sqrt{3} R - c)^2 = 0.$$

Whereby (a) and (c) are the respective vertex and focal point of the ellipsoidal portion 32 of the reflective surface 30.

Following is an example of a reflective surface 30 configuration based on a predetermined set of parameters $a'$, $\theta_f$ and R from which $c'$, c, a and L may be determined. Starting with a fiber optic light guide having a radius $(a') = 4$ mm, a numerical aperture $\theta_f = 40°$ and an ellipsoidal portion 32 having a radius (R) of 20 mm, the unknowns $c'$, c, a and L defining the reflective surface 30 are calculated as follows:

$$\theta_I = 2 \sin^{-1}\left[\frac{4}{20} \sin \frac{40}{2}\right]$$

$$\theta_I = 7.85$$

solving for $c'$ $$c'^2 - \frac{(4)^2}{(20^2 - 4^2)} (\tan 7.85) c^1 - \left[1 + \frac{20}{(20^2 - 4^2)} (\tan 7.85)\right]$$

$$(4)^2 = 0$$

$$c'^2 - .302 c' - 22.048 = 0$$

$$c' = 4.84$$

and $$L = \left(\frac{4.84^2}{4.0^2} - 1\right)(20^2 - 4^2)$$

$$L = 178$$

solving now for the focal points (c) and the vertices (a) of the ellipsoidal portion $$c = \frac{20}{2}\left(\frac{\tan 7.85 + \tan 30}{(\tan 7.85)(\tan 30)}\right)$$

$$c = 89$$

and $$a^4 - a^2 (89^2 + 20^2 + [(\sqrt{3}(20) - 89]) +$$

$$89^2((\sqrt{3})(20) - 89)^2 = 0$$

$$a = 91$$

Therefore, the overall length (P) of the reflective surface 30 is determined by the following equation:

$$(a - c) + L + \frac{R}{\tan \theta_b} = P$$

wherein $$P = (91 - 89) + 178 + \frac{20}{\tan 30}$$

$$P = 214.6 \text{ mm}$$

Turning now to FIGS. 5-8, the apparatus is illustrated as an emitter 60 for collecting and emitting the light rays 62a, b, c from a light source 64, such as a bulb element 66, through a lens 68. The emitter 60 includes a reflective surface 70 including paraboloidal 72, ellipsoidal 74 and hyperboloidal 76 portions. FIG. 6 shows light rays 62a, 62b, 62c exiting the emitter 60 as useable light. As shown in FIG. 6, the end 61 of the emitter 60 which emits the light rays 62a, 62b, 62c has a smaller diameter (2a') than the overall diameter of the reflective surface 70. The present invention enables the development of low profile and highly efficient lights, while allowing a designer greater latitude with respect to the aerodynamic and aesthetic styling of a vehicle.

Referring now to FIG. 8, a schematic of the emitter 60 is shown. The configuration of the emitter 60 is determined using the following predetermined parameters: the packaging depth (D), the height of the emitter (2R), the radius (H) of the elliptical portion and the location of the two focal points ($F_1$, $F_2$) of the ellipsoidal portion 74. The focal point of the paraboloidal portion 72 coincides with the first focal point $F_1$ of the ellipsoidal portion 74 and that the light source 64 is placed at the focal point $F_1$ of both the parabolic 72 and elliptical 74 portions. Given the basic dimensions of the emitter 60 packaging, a second focal point $F_2$ should be selected. Beginning with the basic equation of the curves to be revolved to obtain the paraboloidal 72, ellipsoidal 74, and hyperboloidal 76 portions.

$$y^2 = 4fx \quad \text{(parabola)}$$

$$\frac{(x - f - c)^2}{a^2} + \frac{y^2}{b^2} \quad \text{(ellipse)}$$

where a, b are lengths of semi-major and minor axes and c is the focal length of ellipse. Also $$c^2 = a^2 - b^2$$

and $$\frac{y^2}{a'^2} - \frac{(x - c - d - f)^2}{b'^2} = 1 \quad \text{(hyperbola)}$$

wherein $$b'^2 = c'^2 - a'^2$$

and c' is the focal length of the hyperbola. If 2H is the overall height of the collector and 2R is the exit diameter of the collector $$\theta^I = \tan^{-1}\frac{c'}{(2c + d)}$$

$\theta_I$ represents the angle of light that will be collected by the hyperboloidal portion 76 and directed outward through the lens 68. An emitter 60 designed in accordance with the forgoing procedure is set forth below.

Starting with the following predetermined parameters: an overall package height (2H) of 120 mm, an emitter height of 2R where R=25 mm, a chosen focal length of the parabola f=30 mm. The distance is given by $$X = \frac{R^2}{4f} = 5.21 \text{ mm.}$$

The focal length of the ellipse $c = \sqrt{a^2 - H^2}$. Setting, for example a=3H, c=169.70 mm. To send all the light collected by the ellipsoid through the exit, the dimension d is chosen as $$d = \frac{RC}{H} = 70.71 \text{ mm.}$$

The focal length c' of the hyperbola for this configuration is found to be therefore $$c' = 113 \text{ mm}$$

$$\theta_I = \tan^{-1}\left(\frac{113}{169.7 + 169.7 + 70.71}\right)$$

$$= 15.42°$$

The angle of light covered by the hyperbola is given by $$\theta = \tan^{-1}\left(\frac{H}{C}\right)$$

$$= \tan^{-1}\left(\frac{60}{169.7}\right)$$

$$= 19.47°$$

The angle of light which is not effectively sent through the exit is 19.47°−15.42°=4.05°. This angle is very small and can be further reduced by iteration. An emitter 60 designed according to the foregoing method results in a lens profile smaller than the overall diameter of the reflective surface diameter. The light collected by the paraboloidal section is directly transmitted to the lens, light collected by the ellipsoidal portion will be focused at $F_2$, however the light rays will be directed in the desired direction by lens optics and the light collected by the hyperboloidal portion will also be directed towards the lens. To better control the spread of light at the exit, segmentted reflected geometries (complex surfaces) can be used.

An emitter 60 designed according to the foregoing method results in a lens profile smaller than the overall diameter of the reflective surface 70. The light collected by the paraboloidal section 72 is directly transmitted to the lens 68, light collected by the ellipsoidal portion 74 will be focused at $F_2$, the light rays 62a will be directed in the desired direction by the lens 68 and the light collected by the hyperboloidal portion 76 will also be directed towards the lens 68. To better control the spread of light at the exit, segmented reflected geometries (complex surfaces) can be used.

Figure 9:
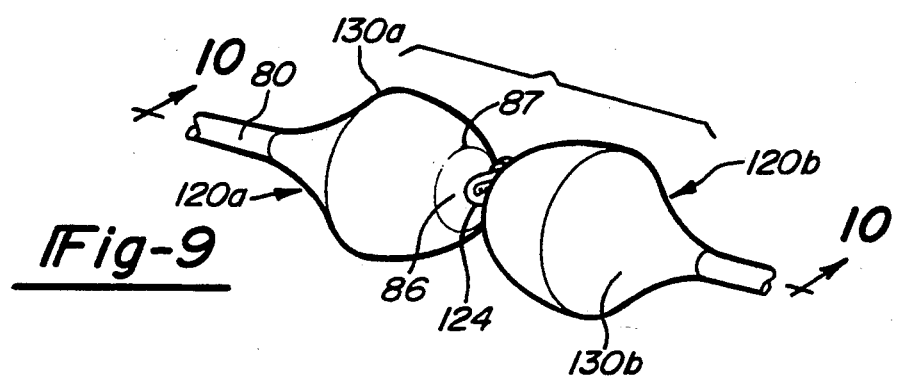
FIG. 9 is a perspective view of a first alternative embodiment of the apparatus of FIG. 1.
Figure 10:
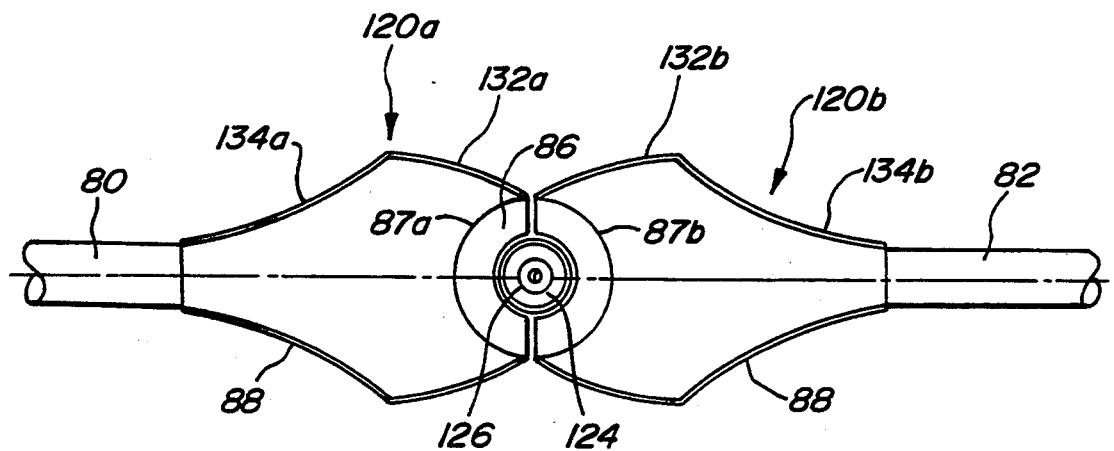
FIG. 10 is a sectional view taken along line 10—10 of FIG. 9.
Figure 11:
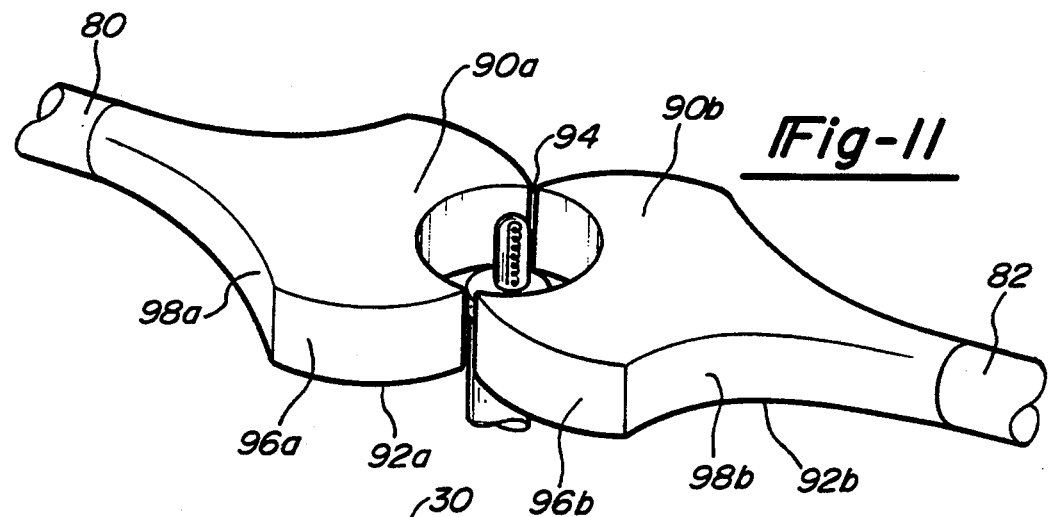
FIG. 11 is a perspective view of a second alternative embodiment of the apparatus of FIG. 1.

Referring now to FIGS. 9-11, a first alternative embodiment of a collector 120 is shown. Like parts of the collector 20 have like reference numerals increased by a factor of one hundred (100). FIG. 9 shows to solid collectors 120a, b made preferably from a transparent, acrylic or polycarbonate material positioned adjacent a light source 124. The use of two collectors 120a, b allows the light rays to be transmitted through two separate individual light pipes 80, 82. The overall configuration of the reflective surfaces 130a, b, i.e., the ellipsoidal portion 132a, b and hyperboloidal portion 134a, b is determined in accordance with the foregoing method. As shown in FIG. 10, the focal points of the elliptical portions 132a, b coincide with the center of a removed spherical portion 86. The light source 124 is positioned at the focal point of the ellipsoidal portions 132a, b. By placing the light source 124 at the focal point, the light generated by the light source 124 enters the left 120a and right half 120b of the collector 120 through the spherical surface 87a, b with close to a 90° incident angle to reduce any effects of reflection which prevent the light entering the collectors 120a, b. A lower index of refraction material, called cladding 88, covers the entire surface of both the ellipsoidal portion 132a, b and the hyperboloidal portion 134a, b, except for the spherical portion 86. The foregoing embodiment provides a collector having a single input (light source) and multiple outputs (light guides) which can be used to transmit light to multiple remote locations.

FIG. 11 shows a second alternative embodiment of the collector 120a, b shown in FIG. 10 having a reflective surface 130a, b including ellipsoidal 96a, b and hyperboloidal 98a, b side surface and planar upper and lower surfaces 90a, b, 92a, b. A light source 94 from which light rays are emitted to a predominately cylindrical form is placed at the focal point of the ellipsoidal side surface 96a, b. The ellipsoidal 96a, b and hyperboloidal 98a, b side surface collects and focus the light emitted by the light source 94 onto the ends of the light guides 80, 82. Such a collector results in a compact duration and highly efficient light collection system for transmitting light to a remote location.

An apparatus of the type disclosed herein collects substantially all of the light rays emitted from the light source. The light may be distributed in a variable intensity pattern or as usable light by the apparatus in the form of an emitter or the apparatus may take the form of a collector for focusing the distributing light into a fiber optic light guide.

What is claimed is:

1. An apparatus for collecting and transmitting light comprising:
   a light source emitting light; and
   a reflective surface, including an ellipsoidal portion and a hyperboloidal portion, supported in a surrounding relationship, adjacent said light source, such that said reflective surface receives and directs the light emitted by said light source into a light guide positioned adjacent said reflective surface wherein said light source is positioned at a first focal point of said ellipsoidal portion and said hyperboloidal portion is positioned between said light guide and said ellipsoidal portion.

2. An apparatus as set forth in claim 1 wherein said ellipsoidal portion includes a second focal point enclosed by said reflective surface, such that said light passes through said second focal point prior to being directed into said light guide.

3. An apparatus as set forth in claim 1 wherein said light guide includes a fiber optic light guide.

4. An apparatus as set forth in claim 1 wherein the ellipsoidal portion is determined in part by the following equation:

$$a^4 - a^2(c^2 + R^2 + [\sqrt{3}\, R - c]^2) + c^2(\sqrt{3}\, R - C)^2 = 0.$$

where a = vertex of the ellipsoidal portion, R = the radius of the elliptical portion and c = the focal point of the ellipsoidal portion.

5. An apparatus as set forth in claim 1 wherein said reflective surface includes a paraboloidal portion, said paraboloidal portion positioned adjacent said ellipsoidal portion such that said ellipsoidal portion is positioned between said paraboloidal portion and said hyperboloidal portion.

6. An apparatus as set forth in claim 5 wherein said paraboloidal portion includes a second focal point;
   said paraboloidal portion and said ellipsoidal portion positioned such that said first and second focal points coincide; and
   said hyperboloid portion positioned adjacent said ellipsoidal portion and forming an aperture through which the light emitted from the light source and reflected by the reflective surface is directed.

7. An apparatus as set forth in claim 6 wherein said paraboloidal and ellipsoidal portions include a focal axis, said paraboloidal and ellipsoidal portions joined at a plane passing through the focal axis normal to the focal axis.

8. An apparatus as set forth in claim 1 wherein the hyperboloidal portion is determined in part by the following equation:

$$c'^2 - \frac{a'^2}{(R^2 - a'^2)\tan\theta_1} c' - \left[1 + \frac{R}{(R^2 - a'^2)\tan\theta_1}\right]$$
$$a'_2 = 0$$

where $c'$ = focal point of the hyperboloidal portion, $a'$ = the radius of the fiber optic light guide, $R$ = the radius of the elliptical portion of the reflective surface and $\theta_1$ = the maximum angle of incidence of the light ray striking the focal disc defined by $c'$.

9. An apparatus for collecting and transmitting light comprising:
   a light source emitting light;
   a reflective surface having an ellipsoidal portion and an hyperboloidal portion;
   said ellipsoidal portion having a focal point, said light source positioned at said focal point; and
   a light guide positioned adjacent said hyperboloidal portion, such that said hyperboloidal portion is positioned between said ellipsoidal portion and said light guide, said reflective surface collecting and directing said light into said light guide.

10. An apparatus as set forth in claim 9 wherein said reflective surface includes a solid body formed of a transparent material having an index of refraction, and an outer surface of said solid body coated with a material having an index of refraction lower than the index of refraction of said transparent material.

11. An apparatus for collecting and transmitting light comprising;
    A light source emitting light; and
    a reflective surface, including a ellipsoidal portion and hyperboloidal portion, supported in a surrounding relationship adjacent said light source, such that said reflective surface receives and directs the light emitted by said light source onto a lens positioned adjacent said reflective surface wherein said light source is positioned at a first focal point of said ellipsoidal portion and said hyperboloidal portion is positioned between said lens and said ellipsoidal portion.

12. An apparatus as set forth in claim 11 wherein said reflective surface includes a paraboloidal portion, said paraboloidal portion positioned adjacent said ellipsoidal portion such that said ellipsoidal portion is positioned between said paraboloidal portion and said hyperboloidal portion.

* * * * *